United States Patent [19]

Suzuki et al.

[11] Patent Number: 4,680,331

[45] Date of Patent: Jul. 14, 1987

[54] AQUEOUS COATING COMPOSITION OF FLUOROCARBON RESIN

[75] Inventors: Takeshi Suzuki, Nagaokakyo; Shigetake Tominaga, Ibaraki; Masanori Nakai, Osaka, all of Japan

[73] Assignee: Daikin Kogyo Co., Ltd., Osaka, Japan

[21] Appl. No.: 832,622

[22] Filed: Feb. 25, 1986

Related U.S. Application Data

[63] Continuation-in-part of Ser. No. 758,240, Jul. 24, 1985, abandoned.

[30] Foreign Application Priority Data

Jul. 25, 1984 [JP] Japan .................................. 59-154969

[51] Int. Cl.$^4$ ............................................. C08K 5/54
[52] U.S. Cl. ..................................... 524/269; 524/265
[58] Field of Search ............... 524/262, 263, 264, 265, 524/269

[56] References Cited

U.S. PATENT DOCUMENTS 2,613,193 10/1952 Osdal .................................... 524/269
2,644,802 7/1953 Lontz .................................... 524/269

*Primary Examiner*—Paul R. Michl
*Attorney, Agent, or Firm*—Armstrong, Nikaido, Marmelstein & Kubovcik

[57] ABSTRACT

This invention provides a fluorocarbon resin aqueous coating composition comprising:
(a) a fluorocarbon resin, and based on the amount by weight of the resin
(b) about 1 to about 10% by weight of a silicone emulsion (calculated as silicone oil contained),
(c) about 1 to about 40% by weight of a flaky inorganic material, and
(d) about 3 to about 10% by weight of a nonionic surfactant, or a mixture of nonionic surfactant and anionic surfactant, the composition containing about 25 to about 75% by weight of water based on the whole composition.

7 Claims, No Drawings

AQUEOUS COATING COMPOSITION OF FLUOROCARBON RESIN

This application is a continuation-in-part of application Ser. No. 758,240 filed on July 24, 1985, abandoned.

The present invention relates to aqueous coating compositions of fluorocarbon resin for protecting and coating structural sheet materials, and more particularly to aqueous coating compositions of fluorocarbon resin which are outstanding in abrasion resistance, flex resistance, coating strength and various other characteristics.

Glass fabric or metal fabric coated with polytetrafluoroethylene has been developed in recent years as a tent material or structural sheet material for use in air-inflated structures such as air roofs and the like. However, the polytetrafluoroethylene coating the fabric used to seal off the interstices (so-called windows) between the constituent yarns of the fabric, is liable to develop mud cracks or minor cracks and is therefore unusable for airtight structures.

Proposals have been made to overcome the above drawback of the polytetrafluoroethylene coating composition. These proposals are all directed to the addition of glass beads, glass bubbles or like filler to a fluorocarbon resin dispersion as means for filling up the yarn-to-yarn windows of the substrate fabric.

Unexamined Japanese Patent Publication No. 49-13496, for example, discloses a polytetrafluoroethylene composition having incorporated therein glass beads in an amount of 10 to 50%, preferably 30 to 40%, based on the combined amount by dry weight of the polymer and the glass, the glass beads being about 4 to about 800 μm, preferably up to 7.5 μm, in particle size. According to the disclosure, the substrate fabric can be coated with this composition more effectively than when the fluorocarbon resin is used singly because the glass beads selectively flow into and span the windows. The publication states that the above phenomenon does not occur with fillers, such as mica, of the minute plate type which, if used, give a coating of insufficient cracking resistance. This means that the substrate fabric is not satisfactorily coatable with a fluorocarbon resin dispersion which is free from a filler or which contains a filler of the minute plate type, and that the presence of glass beads provides satisfactory coatings. On the other hand, the publication mentions nothing specifically about the critical cracking thickness of the coatings which are said to be given improved cracking resistance by then use of glass beads, i.e. about the maximum thickness of sintered coatings which are available without cracking, while the publication states that the substrate is coated 10 to 20 times or more, suggesting that each single coat has a considerably small thickness. The disclosed technique then has a serious disadvantage. For example, when a coating having a thickness of 800 μm on finishing is to be formed on a 700-micron-thick glass fabric by dip coating, the coating operation must be repeated a large number of times resulting in greatly increased cost. It is well-known in the art that the fluorocarbon resin dispersion, when merely incorporating a filler and thickened as disclosed in the publication, is unable to give coatings of greatly improved cracking resistance.

Examined Japanese Patent Publication No. 55-7148 similarly discloses a composition comprising a fluorocarbon resin dispersion and 5 to 50% by weight of glass beads of up to 25 μm. The publication merely says: "The presence of spherical beads assures that the finish coating will not develop serious cracks or pinholes that would promote weathering of the article." Although the disclosure suggests that the presence of the filler gives a larger critical cracking thickness than otherwise, the coating obtained is not always satisfactory in cracking resistance.

Unexamined Japanese Patent Publication No. 54-150454 discloses a method wherein in place of glass beads or glass bubbles, fibrous calcium metasilicate is used as a filler for giving improved cracking resistance. Although improved cracking resistance attained is mentioned also in this publication, no reference is made to the criticaal cracking thickness. When singly present, the filler is unable to achieve a great improvement in cracking resistance as already mentioned.

With respect to other properties, all the foregoing publications state that improvements have been made in abrasion resistance, flex resistance and coating strength, but the improved properties are not always satisfactory. Further when the coatings of the known techniques are evaluated from the viewpoint of freedom from staining and tackiness, all the fillers used render the coating rough-surfaced, impairing the desirable good slipping characteristics and tackiness-free characteristics to reduce the commercial value of the product.

An object of the present invention is to provide an aqueous coating composition of fluorocarbon resin which has overcome the drawbacks of the conventional polytetrafluoroethylene coating compositions described above.

Another object of the present invention is to provide a fluorocaron resin aqueous coating composition capable of giving smooth-surfaced coatings which are outstanding not only in cracking resistance but also in abrasion resistance, flex resistance and strength.

Still another object of the present invention is to provide articles which are covered with a coating having such outstanding properties.

These objects and other features of the present invention will become apparent from the following description.

The present invention provides a fluorocarbon resin aqueous coating composition comprising (a) a fluorocarbon resin, and based on the amount by weight of the resin (b) about 1 to about 10% by weight of a silicone emulsion (calculated as silicone oil contained), (c) about 1 to about 40% by weight of a flaky inorganic material, and (d) about 3 to about 10% by weight of a nonionic surfactant, or a mixture of nonionic surfactant and anionic surfactant, the composition containing about 25 to about 75% by weight of water based on the whole composition.

According to the present invention, a crack-free coating of the desired thickness can be prepared from the coating composition by a reduced number of coating steps. Usually, crack-free coatings are readily obtained with a thickness of about 100 μm on sintering. The present coating composition has good storage stability. The coating obtained on finishing retains the inherent properties of fluorocarbon resin, such as slipping characteristics, cfreedom from staining and weather resistance, without any substantial degradation. The coating additionally is free of discoloration which would affect the commercial value of the product. The coating is free from cracks and is therefore resistant to the penetration of chemical solutions, water and the like. Additionally, the coating is excellent in light transmitting properties, abrasion resistance, flex resistance, tensile strength at break, etc.

According to the present invention, various fluorine-containing polymers are usable as fluorocarbon resins. Examples of preferred fluorocarbon resins are homopolymers such as polytetrafluoroethylene (PTFE) and polyvinylidene fluoride (PVdF); copolymers such as tetrafluoroethylene-perfluoroalkyl perfluorovinyl ether copolymer (PFA), tetrafluoroethylene-hexafluoropropylene copolymer (FEP), ethylene-tetrafluoroethylene copolymer (ETFE) and ethylene-chlorotrifluoroethylene copolymer (ECTFE); and mixtures of such polymers. Of these resins, especially preferable are homopolymers or copolymers of tetrafluoroethylene, such as PTFE, PFE, FEP and the like. These fluorocarbon resins are readily available in the form of aqueous dispersions (generally containing a nonionic surfactant as the dispersing agent) usually having a concentration of 30 to 70% by weight. However, such resins are usable also in the form of powder.

The silicone emulsion to be used in the present invention is a white turbid emulsion which is prepared from a silicone represented by the formula

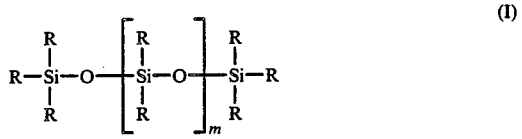

wherein R is alkyl, phenyl, alkoxy, phenoxy or H, and m is an integer of from about 1 to about 100, by dispersing the silicone in water with use of a nonionic or anionic emulsifier. The alkyl group, as well as the alkoxy group, in the formula (I) is preferably one having about 1 to about 10 carbon atoms. The silicone oil concentration of the silicone emulsion is generally about 20 to about 80% by weight.

Examples of useful flaky inorganic materials are flaky particles of $SiO_2$, $TiO_2$, $Al_2O_3$, mica, talc, clay and glass, which are usually about 1 to about 80 μm in mean particle size and about 1.8 to about 3.5 in specific gravity. Preferably, the flaky inorganic material is about 1 to about 50 μm in mean particle size, more preferably one having smaller particle sizes within this preferred range.

Useful nonionic surfactants are not limited to those which are generally soluble in water at room temperature (20° to 25° C.) but also include those which are soluble in water at higher temperatures although insoluble at room temperature. Such surfactants are used singly, or at least two of them are used in combination. Examples of preferred combinations are those of alkylphenol compounds, e.g. the combination of a highly oleophilic nonionic surfactant having added thereto up to 6 moles of ethylene oxide and a strongly hydrophilic nonionic surfactant having 7 to 15 moles of ethylene oxide added thereto. Examples of especially preferable nonionic surfactants are alkylphenol surfactants represented by the formula

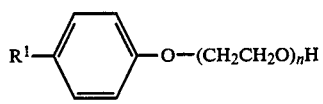

wherein $R^1$ is a saturated or unsaturated aliphatic hydrocarbon group, an n is an integer of from about 2 to about 50, and ester-type surfactants represented by the formula

wherein $R^1$ and n are as defined above. With reference to the formulae (II) and (III), preferable groups $R^1$ are alkyl, alkenyl and alkynyl groups having about 8 to about 18 carbon atoms. More preferable groups $R^1$ are —$C_8H_{17}$, —$C_9H_{19}$, —$C_{10}H_{21}$ and the like.

Examples of preferable anionic surfactants are carboxylic acid surfactants represented by the formula

wherein $R^2$ is a hydrocarbon group or fluorine-containing hydrocarbon group having 2 to 22 carbon atoms, n' is an integer of from 1 to 4, and M is H, $NH_4$, Na or K, and sulfonic acid surfactants represented by the formula

wherein $R^2$, M and n' are as defined above. With reference to the formulae (IV) and (V), examples of preferred hydrocarbon groups or fluorine-containing hydrocarbon groups $R^2$ are alkyl, alkenyl, alkynyl and aromatic groups which may be substituted with fluorine, among which —$C_7H_{15}$, —$C_8H_{17}$, —$C_9H_{21}$, —$C_7F_{15}$, —$C_6F_{13}$, etc. are more preferable.

The components other than the fluorocarbon resin are formulated into the coating composition of the present invention in the following proportions based on the amount by weight of the fluorocarbon resin.

The silicone emulsion is used in an amount of about 1 to about 10% by weight, preferably about 2 to about 4% by weight, calculated as the silicone oil contained therein. If the amount is less than 1% by weight, it is often impossible to prevent the coating from cracking during sintering and to form thick coatings. If the amount exceeds 10% by weight, the volatiles will not fully evaporate off during sintering, with the resulting likelihood that the decomposed products will remain to adversely affect the color of the coating and the formation of coating.

The flaky inorganic material is used in an amount of about 1 to about 40% by weight, preferably about 2 to about 30% by weight. With less than 1% by weight of the material present, improved abrasion resistance will not be obtained, while the lesser amount is not desirable since the resulting coating will not be fully impermeable to the liquid to which it is exposed. Amounts above 40% by weight result in impaired light transmitting properties and impaired mechanical strength.

The nonionic surfactant, or the mixture of nonionic surfactant and anionic surfactant is used in an amount of about 3 to about 10% by weight, preferably about 5 to about 8% by weight. If the amount is well below 3% by weight, it is generally likely that the aqueous coating composition will become impaired in mechanical stability and permit sedimentation of the filler. When the amount greatly exceeds 10% by weight, decomposed products remain in the sintered coating, which tends to assume a brown color. When the mixture of nonionic and anionic surfactants is used, it is desirable to use up to 3% by weight of the anionic surfactant based on the amount by weight of the fluorocarbon resin. As already mentioned, aqueous dispersions of fluorocarbon resins and the silicone emulsion contain a nonionic or anionic surfactant. The amount of surfactant(s) to be used (about 3 to about 10% by weight) includes the amount of nonionic or anionic surfactant contained in the aqueous dispersion or silicone emulsion.

The fluorocarbon resin aqueous coating composition of the present invention is prepared by uniformly mixing together the specified amounts of the components by stirring. In addition to the essential components described above, various coloring pigments, and silane coupling agents, etc. for giving the filler improved dispersibility and enhanced affinity for the fluorocarbon resin can of course be incorporated into the present composition when so required. In view of the applicability of the present composition thus prepared, it is desired that the composition have a viscosity of about 50 to about 1000 cp, preferably of about 100 to about 500 cp. The viscosity is adjustable by suitably selecting the components to be used, or by admixing water or other additive with the composition obtained.

The amount of water to be present in the fluorocarbon resin aqueous coating composition of the present invention usually ranges from about 25 to about 75% by weight, preferably about 30 to about 60% by weight, based on the whole composition. If the amount of the water is less than about 25% by weight, the resulting coating composition will have an increased viscosity and give an excessively thick coat in a single application so that the resulting coating tends to develop cracks. If the amount of water is more than about 75% by weight, the resulting coating composition will have poor storage stability, and give a very thin coat in a single application.

The fluorocarbon resin aqueous coating composition of the present invention is used for coating articles made of glass fabric, metal fabric or the like by applying the composition to the article, drying the coated article and sintering the coating at a temperature not lower than the melting temperature of the fluorocarbon resin used.

Because the present coating composition comprises the silicone emulsion in combination with the nonionic surfactant or with the mixture of nonionic and anionic surfactants, the composition gives coatings of improved cracking resistance, readily filling up the windows of the substrate glass fabric or metal fabric without resorting to the aid of some special inorganic filler. The presence of the flaky inorganic material gives the composition greater advantages than otherwise with respect to reduced cost, improved abrasion resistance, suitable flexibility and enhanced impermeability to rainwater or other liquids. In the characteristics of the coating, such as tensile strength, abrasion resistance and impermeability to liquids, the present composition is superior to those containing other fillers such as glass beads, glass bubbles or like spherical inorganic fillers or amorphous fillers.

The present invention will be described in greater detail with reference to the following examples and comparison examples, wherein percentages are all by weight unless otherwise specified, and the amounts of the components other than fluorocarbon resin are expressed in % by weight based on the weight of the resin.

The glass fabrics of the following specifications were used.

| Glass fabric | Weave | Fineness of monofilament (denier) | Yarn density (yarns/25 mm) Warp | Yarn density (yarns/25 mm) Weft | Thickness (mm) |
| --- | --- | --- | --- | --- | --- |
| A | Plain | 150 | 24 | 20 | 0.50 |
| B | Plain | 75 | 20 | 15 | 0.45 |

EXAMPLE 1

To 60% aqueous dispersion of polytetrafluoroethylene (containing 6% of a nonionic surfactant, TRITON X-100, product of Rohm & Haas Co.) were admixed 2% of a mixture of nonionic surfactants (i.e. EMALGEN 905 and EMALGEN 810, 10:1 by weight ratio, both products of Kao Soap Co., Ltd.), and 10% of a silicone emulsion (TSM630, product of Toshiba Silicone Co., concentration 36 wt.%), and the mixture was stirred. To the mixture was added 20% of flaky talc (TALC TY-80, product of Toyo Kasei Co., Ltd., mean particle size 7 μm, specific gravity 2.6) while stirring, and the resulting mixture was further stirred to obtain a dispersion having a viscosity of 250 cp.

Glass fabric A was impregnated with the dispersion by the following procedure.
(i) The fabric was impregnated with 60% aqueous dispersion of polytetrafluoroethylene to form a single primer coat, followed by sintering at 380° C.
(ii) The fabric was then dipped in the above dispersion for impregnation, then dried, and sintered at 380° C.
(iii) The step (ii) of impregnation, drying and sintering was repeated three times.

Consequently an impregnated product was obtained which had a polytetrafluoroethylene coating with a thickness of about 150 μm (on each side of the fabric herein and hereinafter).

When the impregnated glass fabric was microscopically observed, the coating was found to be neat, free from cracks or pinholes and very smooth-surfaced.

EXAMPLE 2

An aqueous dispersion was prepared in exactly the same manner as in Example 1 with the exception of using 2% of a nonionic surfactant (NONION NS-204.5, product of Nippon Oils & Fats Co., Ltd.) in place of the surfactant mixture used in Example 1 and 15% of glass flakes (CCF-325, product of Nippon Sheet Glass Co., Ltd., mean particle size 30 μm, specific gravity 2.5) in place of talc. The dispersion had a viscosity of 320 cp.

Glass fabric A was impregnated with the aqueous dispersion by the same procedure as in Example 1 to obtain an impregnated product with a coating thickness of 160 μm.

When microscopically observed, the coating was found free from cracks or pinholes and smooth-surfaced.

EXAMPLE 3

An aqueous dispersion (viscosity 280 cp) was prepared in the same manner as in Example 1 with the exception of using 15% of flaky silica (FLORITE S-800, product of Tokuyama Soda Co., Ltd., mean particle size 25 μm, specific gravity 2.5) in place of the talc used in Example 1 and 10% of a silicone emulsion (KM722, product of Sin-Etsu Chemical Co., Ltd., concentration 30 wt.%) in place of the silicone emulsion TSM630.

Glass fabric B was impregnated with the aqueous dispersion by the same procedure as in Example 1 to obtain an impregnated product with a coating thickness of 170 μm.

A microscopic observation of the product revealed the same result as in Example 1.

EXAMPLE 4

To 60% aqueous dispersion of polytetrafluoroethylene (containing 6% of TRITON X-100) were added 2% of an anionic surfactant (perfluoroalkylcarboxylate type, DS.101, product of Daikin Industries, Ltd.) and 10% of a silicone emulsion (KM722, product of Sin-Etsu Chemical Co., Ltd.) TALC TY-80 (10%), was further added to the mixture with stirring to obtain a dispersion having a viscosity of 220 cp.

Glass fabric A was impregnated with the dispersion by the same procedure as in Example 1 to prepare an impregnated product having a polytetrafluoroethylene coating with a thickness of 140 μm. The coating was found to be free from cracks or pinholes, neat and very smooth-surfaced.

COMPARISON EXAMPLE 1

An aqueous dispersion (viscosity 300 cp) was prepared in the same manner as in Example 1 with the exception of using 5% of amorphous quartz glass (SILICA 105, product of Denki Kagaku Kogyo Kabushiki Kaisha, mean particle size 50 μm, specific gravity 2.2) in place of the talc used in Example 1 and 5% of a silicone emulsion (LE-45, product of Nippon Unicar Co., Ltd., concentration 35 wt.%) in place of the silicone emulsion TSM630.

Glass fabric A was impregnated with the dispersion by the same procedure as in Example 1 to obtain an impregnated product having a coating thickness of 150 μm.

When the product was microscopically observed, the coating was found to be free from cracks and pinholes but slightly rough-surfaced.

COMPARISON EXAMPLE 2

An aqueous dispersion having a viscosity of 260 cp was prepared by adding to 60% aqueous dispersion of polytetrafluoroethylene 2% of nonionic surfactant EMALGEN 905 and 10% of glass beads (GB-210, product of Toshiba Ballotini Co., Ltd., mean particle size 20 μm).

Glass fabric B was impregnated with the dispersion by the same procedure as in Example 1 to obtain an impregnated product having a polytetrafluoroethylene coating with a thickness of 150 μm.

When the product was microscopically observed, many cracks and pinholes were found. The coating was very rough-surfaced.

COMPARISON EXAMPLE 3

To a 60% aqueous dispersion of polytetrafluoroethylene were added 72% of a mixture of nonionic surfactants, i.e. EMALGEN 905 and EMALGEN 810 (10:1 in weight ratio), and 5% of silicone emulsion LE-45. To the mixture were added 20% of glass beads, GB-210 with stirring to obtain an aqueous dispersion having a viscosity of 230 cp.

Glass fabric A was impregnated with the dispersion by the same procedure as in Example 1 to obtain an impregnated product having a polytetrafluoroethylene coating with a thickness of 140 μm. When the product was microscopically observed, the coating was found to be free from cracks or pinholes but was rough-surfaced.

The compositions of Examples 1 to 4 and Comparison Examples 1 to 3 were tested for the following coating properties. The products of the invention were found to be superior in any of the tested properties. As a rule, each test was conducted five times, and the average result is listed.

(1) Cracking resistance and smoothness of coating

Each composition was applied to a glass panel by a doctor blade, then dried in air and thereafter sintered in an oven at 380° C. for 10 minutes. The coating obtained was microscopically checked for cracks and pinholes. The smoothness was evaluated by feeling the coating surface with hand. Table 1 shows the results.

TABLE 1

| Coating thickness (μm) | Occurrence of cracks or pinholes | | | Smoothness |
|---|---|---|---|---|
| | 10 | 50 | 100 | |
| Example 1 | None | None | None | Good |
| Example 2 | None | None | None | Good |
| Example 3 | None | None | None | Good |
| Example 4 | None | None | None | Good |
| Comp. Ex. 1 | None | None | None | Poor |
| Comp. Ex. 2 | None | Many cracks | Large cracks | Poor |
| Comp. Ex. 3 | None | None | None | Poor |

(2) Abrasion resistance

A piece, 10 cm square, was cut out from each glass fabric obtained in Examples 1 to 4 and Comparison Examples 1 to 3, and a hole with a diameter of 6 mm was formed in the center of the piece. An aluminum piece of identical shape and size was also prepared from a 1.5-mm-thick aluminum plate. The fabric piece was affixed to the aluminum piece with a double-faced adhesive tape to obtain a test piece, which was then tested by a Taber-type abrasion tester. Table 2 shows the results.

Test conditions
Tester: Product of Toyo Seiki Seisakusho Ltd.
Abrasive wheel: CS-17
Load: 1.0 kg
Number of revolutions: 5000 (70 r.p.m.)

The abrasive wheel was regenerated after making every 1000 revolutions before further use.

TABLE 2

| Specimen | Amount of abrasion (g) |
|---|---|
| Example 1 | 0.085 |
| Example 2 | 0.095 |
| Example 3 | 0.090 |
| Example 4 | 0.090 |
| Comp. Ex. 1 | 0.120 |
| Comp. Ex. 2 | 0.120 |
| Comp. Ex. 3 | 0.120 |

(3) Flex resistance

Glass fabric A was impregnated with each aqueous dispersion prepared in Examples 1 to 4 and Comparison Examples 1 to 3, by the same procedure as in Example 1. Specimens with a diameter of 10 mm were cut out from the coated fabric. The specimen was set in a flex tester, MIT, and tested for flex resistance. The test procedure was repeated five times using different specimens of each example. Table 3 shows the range of varying results.

Test conditions
Tester: MIT, product of Toyo Seiki Seisakusho Ltd.
Load (tension): 1.5 kg/10 mm

TABLE 3

| Specimen | Number of flexes causing break |
| --- | --- |
| Example 1 | 18000–20000 |
| Example 2 | 18000–20000 |
| Example 3 | 18000–20000 |
| Example 4 | 18000–20000 |
| Comp. Ex. 1 | 8000–10000 |
| Comp. Ex. 2 | 6000–8000 |
| Comp. Ex. 3 | 6000–10000 |

(4) Tensile strength and elongation

Each aqueous dispersion obtained in Examples 1 to 4 and Comparison Examples 1 and 3 was applied to a glass panel by flow coating, then dried in air and thereafter sintered in an oven at 380° C. for 10 minutes to prepare a film having a thickness of about 50 μm. For Comparison Example 2 which gave a coating of low cracking resistance, the flow coating-sintering cycle was repeated five times to form a single coat with a thickness of 8 to 9 μm each time and to eventually obtain a film with a thickness of about 40 μm.

The specimens thus prepared were tested under the following conditions.

Test conditions
Tensile Tester: Autograph DS-50D, product of Shimazu Corp.
Rate of tension: 50 mm/min.

TABLE 4

| Specimen | Tensile strength at break (kg/cm$^2$) | Elongation (%) |
| --- | --- | --- |
| Example 1 | 180 | 220 |
| Example 2 | 160 | 220 |
| Example 3 | 175 | 230 |
| Example 4 | 180 | 220 |
| Comp. Ex. 1 | 150 | 210 |
| Comp. Ex. 2 | 100 | 110 |
| Comp. Ex. 3 | 110 | 130 |

The foregoing test results reveal that the polytetrafluoroethylene coatings of the present invention containing a flaky inorganic material are superior to those containing a spherical filler (such as glass beads) in the properties required of structural sheet materials.

COMPARISON EXAMPLES 4 TO 11

Eight kinds of dispersions were prepared in the same manner as in Example 1 except that the amounts of silicone emulsion, flaky talc (filler), surfactant and water were varied as listed in Table 5.

The resulting dispersions had the viscosity as shown in Table 5. The dispersions were tested for storage stability by standing at room temperature. The results are listed in Table 5 in which "good" means that the composition did not exhibit sedimentation of the filler even when stored for 48 hours, and "poor" means that the composition exhibited sedimentation of the filler when stored for 1 hour.

Glass fabric A was impregnated with the dispersion in the same manner as in Example 1 to obtain an impregnated product which had a polytetrafluoroethylene coating 50 μm in thickness. By this way, eight kinds of impregnated products were obtained.

The impregnated products were checked microscopically for cracks and also checked for discoloration. The products were also tested for abrasion resistance and tensile strength and elongation in the same manner as described above under the headings of (2) Abrasion resistance and (4) Tensile strength and elongation. The results are listed in Table 5.

Table 5 also lists the results obtained in the same manner as above except that the dispersion of Example 1 was used (listed as "Example 1").

TABLE 5

| | Silicone emulsion[1] (wt. %/p)[2] | Filler (wt. %/p) | Surfactant (wt. %/p) | Water (wt. %)[3] | Viscosity (cP) | Storage stability | Cracks | Discoloration | Amount of abrasion (g) | Tensile strength at break (kg/cm$^2$) | Elongation (%) |
| --- | --- | --- | --- | --- | --- | --- | --- | --- | --- | --- | --- |
| Example 1 | 3.6 | 20 | 8 | 34 | 250 | good | None | None | 0.085 | 180 | 220 |
| Comp. Ex. 4 | 0.5 | 20 | 8 | 32 | 270 | good | Many | None | 0.120 | 90 | 80 |
| Comp. Ex. 5 | 12 | 20 | 8 | 37 | 150 | good | None | Observed | 0.085 | 180 | 200 |
| Comp. Ex. 6 | 3.6 | 0.5 | 8 | 37 | 190 | good | None | None | 0.115 | 170 | 200 |
| Comp. Ex. 7 | 3.6 | 50 | 8 | 29 | 350 | good | None | None | 0.070 | 140 | 160 |
| Comp. Ex. 8 | 3.6 | 20 | 2* | 36 | 45 | poor | None | None | 0.085 | 180 | 220 |
| Comp. Ex. 9 | 3.6 | 20 | 12** | 33 | 650 | good | None | Observed | 0.085 | 150 | 220 |
| Comp. Ex. 10 | 3.6 | 20 | 8 | 79 | 35 | poor | None | None | 0.085 | 150 | 220 |
| Comp. Ex. 11[4] | 2 | 35 | 8 | 22 | 1100 | good | Many | None | 0.085 | 180 | 210 |

[1] calculated as silicone oil contained.
[2] weight percent based on the fluorocarbon resin.
[3] weight percent based on the whole composition.
[4] aqueous dispersion of polytetrafluoroethylene had a concentration of 67%.
*TRITON X-100 alone was used in an amount of 2 wt. %/p.
**6 wt. %/p of TRITON X-100 and 6 wt. %/p of the mixture of EMALGEN 905 and EMALGEN 810 were used.

As seen from Table 5, if the amount of the silicone emulsion is less than 1% (Comp.Ex. 4), the resulting coating composition gives a coating which develops many cracks and which is low in abrasion resistance and tensile strength and elongation, whereas if the amount of the silicone oil is over 10% (Comp.Ex. 5), the resulting coating has a discolored appearance. If the amount of the filler is less than 1% (Comp.Ex. 6), the resulting coating will have low abrasion resistance, whereas if the amount of the filler is more than 40% (Comp.Ex. 7), the resulting coating will have reduced tensile strength and elongation. If the amount of the surfactant is less than 3% (Comp.Ex. 8), the resulting coating will have poor storage stability, whereas if the amount of the surfactant is over 10% (Comp. Ex. 9), the resulting coating will be discolored. If the amount of water is over 75% (Comp.Ex. 10), the resulting coating composition will have poor storage stability, whereas if the amount of water is less than 25% (Comp.Ex. 11), the resulting coating develops many cracks.

We claim:
1. A fluorocarbon resin aqueous coating composition comprising:
(a) a fluorocarbon resin, and based on the amount by weight of the resin

(b) about 1 to about 10% by weight of a silicone emulsion (calculated as silicone oil contained),
(c) about 1 to about 40% by weight of a flaky inorganic material, and
(d) about 3 to about 10% by weight of a nonionic surfactant, or a mixture of nonionic surfactant and anionic surfactant, the composition containing about 25 to about 75% by weight of water based on the whole composition.

2. An aqueous coating composition as defined in claim 1 wherein the flaky inorganic material is at least one member selected from the group consisting of flaky particles of $SiO_2$, $TiO_2$, $Al_2O_3$, mica, talc, clay and glass.

3. An aqueous coating composition as defined in claim 1 wheren the nonionic surfactants is an alkylphenol surfactants represented by the formula

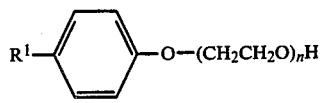

wherein $R^1$ is a saturated or unsaturated aliphatic hydrocarbon group, and n is an integer of from about 2 to about 50, or an ester-type surfactants represented by the formula

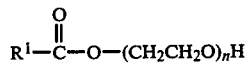

wherein $R^1$ n are as defined above.

4. An aqueous coating composition as defined in claim 1 wherein the anionic surfactant is a carboxylic acid surfactant represented by the formula $$R^2-(COOM)_{n'}$$

wherein $R^2$ is a hydrocarbon group or fluorine-containing hydrocarbon group having 2 to 22 carbon atoms, $n'$ is an integer of from about 1 to 4, and M is H, $NH_4$, Na or K, or a sulfonic acid surfactant represented by the formula $$R^2-(SO_3M)_{n'}$$

wherein $R^2$, M and $n'$ are as defined above.

5. An aqueous coating composition as defined in claim 1 comprising
(a) a fluorocarbon resin, and based on the amount by weight of the resin,
(b) about 2 to about 4% by weight of a silicone emulsion (calculated as silicone oil contained),
(c) about 2 to about 30% by weight of a flaky inorganic material, and
(d) about 5 to about 8% by weight of a nonionic surfactant or a mixture of nonionic surfactant and anionic surfactant, the composition containing about 30 to about 60% by weight of water based on the whole composition.

6. A method of coating an article which comprises applying to the article a composition as defined in claim 1, drying the coated article, and sintering the coating at a temperature of above the melting temperature of the fluorocarbon resin employed.

7. An article coated by the method of claim 6.

* * * * *